Patented Oct. 13, 1936

2,057,600

UNITED STATES PATENT OFFICE 2,057,600

A COATING COMPOSITION

Mitchell Graham Thomson, Saltcoats, Scotland, assignor to Imperial Chemical Industries Limited, a corporation of Great Britain No Drawing. Application March 30, 1935, Serial No. 13,923. In Great Britain January 30, 1934

3 Claims. (Cl. 134—79)

The present invention relates to improvements in the art of producing coated fabrics, for example leathercloth, tarpaulin and the like, of the kind comprising a base material such as cotton, Hessian or paper coated with a composition containing dissolved nitrocellulose and a softening agent therefor.

Certain softening agents which have hitherto been used in such compositions, for example vegetable oils such as castor oil, blown castor oil and blown cottonseed oil, belong to the class of softeners that have little or no solvent action on nitrocellulose. These softening agents, however, exhibit a tendency to become rancid on storage and coated fabrics in the manufacture of which they have been employed exhibit a similar tendency. Moreover when coated fabrics containing these softeners are heated to a temperature of about 70° C., they tend to exude droplets of oil on the surface of the fabric.

It has been proposed to use softeners such as tricresyl phosphate instead of the above mentioned vegetable oils. Softeners of this type have considerable solvent action on nitrocellulose, and compare favourably with vegetable oil softeners in that they do not develop rancidity on storage, nor exude when the coated fabrics are heated. However, they suffer from the disadvantage that nitrocellulose compositions containing them are thermoplastic after removal of any volatile solvents and/or diluents, and that in consequence fabrics coated with such compositions become tacky or sticky when warm. This effect is particularly troublesome during manufacturing processes, such as the production of the coated material in continuous webs by hot-plate spreading machines which involves lapping the hot coated material in folds, and in the embossing of the coated material.

I have found that, if tricresyl phosphate is brominated in the nucleus so that a dibromotricresyl phosphate is obtained, the product is a valuable softening agent for nitrocellulose in coating compositions of the type described.

The fabrics so coated are satisfactorily flexible at ordinary temperatures and do not become tacky or sticky when warm. Difficulties due to thermoplasticity of the coating are not encountered in the usual manufacturing process, even when temperatures of 100° C. are employed. The coated fabrics have good fire-resistant properties.

The brominated product should correspond substantially to a tricresyl phosphate in which two bromine atoms are nuclearly substituted in the molecule, but a little latitude in the bromine content is permissible. The product preferably contains 27% to 30.5% of bromine, i. e., rather less bromine than the amount corresponding theoretically to the dibromo derivative. A brominated product containing 17.8% bromine and corresponding to monobromotricresyl phosphate is however unsatisfactory for the purpose of my invention, since its use as softener in nitrocellulose coating compositions gives rise to films which become quite sticky when warm; the monobromoderivative resembling in this respect the solvent softeners such as tricresyl phosphate. A brominated product containing 39.6% bromine and corresponding to tribromotricresyl phosphate is also unsuitable for the purpose of my invention, since it has insufficient softening power for the nitrocellulose, and is not compatible therewith in useful proportions. A brominated product containing bromine substituted in the side chain is unsatisfactory in that the so substituted bromine may under certain conditions be hydrolyzed.

The present invention, therefore, consists in a process for producing coated fabrics by treating a base material with a coating composition containing nitrocellulose and, as softening agent therefor, a brominated tricresyl phosphate corresponding substantially in composition to a dibromotricresyl phosphate in which both the bromine atoms are substituted in the nucleus.

The methods employed in the formation of the coating composition and the production of the coated fabrics may be any such as are commonly employed in the art. Thus for example the pigment may be ground with the softener and then incorporated with the nitrocellulose which has been previously gelatinized with suitable solvents. The composition is suitably applied to the base material as a spreader coat.

A dibromotricresyl phosphate suitable for the purpose of my inventon may be prepared in the following manner.

100 parts of tricresyl phosphate, to which 0.1 part of copper powder has been added, are well agitated at ordinary temperature in an apparatus provided with means for stirring and heating or cooling the contents. 150 parts of bromine are added gradually so that the temperature rapidly rises to 55° C. to 60° C., at which point it is maintained during the addition of the remainder of the bromine. After the whole of the bromine has been added, the mixture is maintained at the above temperature for an hour, with constant stirring. The crude product is then purified by agitation with a solution of approximately equal parts of soda ash and sodium sulphite in water. The temperature of the solution during purification is allowed to rise from approximately 50° C. to nearly 100° C. during the addition of the crude product and subsequent agitation. The crude product is rapidly decolorized, and is then removed and freed from alkali by repeated treatment in boiling water with live steam agitation. The purified product is dried by heating, either in an open vessel to approximately 120° C., or at a reduced pressure to approximately 100° C. until all the water has been driven off. The final product is a clear yellowish brown oil, possessing only a faint odour. It contains 27% to 29% bromine, and is substantially free from hydrolyzable side chain substituted bromine.

The low degree of thermoplasticity of the coating composition is particularly marked when nitrocellulose is employed having a nitrogen content lying between 10.5% and 10.8%. I believe that the low thermoplasticity obtained as a result of the present invention is due to the low solvent power of the brominated derivative for the nitrocellulose. The process of the present invention, when employing nitrocellulose of a nitrogen content as stated, is particularly suitable for finishing fabrics already coated either in the manner of the invention or otherwise. The finishing coats obtained are clear and the products are free from any tendency to exudation.

It will be understood that part of the necessary softening action in the coating compositions of the present invention may be contributed by other known or suitable softening agents such as castor oil or other vegetable oils, but certain of the advantages associated with the employment of the brominated derivative will then be realized only to a correspondingly reduced extent.

My invention is illustrated but not limited by the following examples:

Example 1

For the manufacture of tarpaulin cloth, the Hessian backing is coated in known manner with a composition consisting of the following ingredients:—

| | Parts |
|---|---|
| Nitrocellulose | 24 |
| Magnesium ammonium phosphate | 6 |
| Black pigment | 8 |
| Brominated tricresyl phosphate (bromine content 32%) | 62 |
| Mixed solvent (consisting of 40 parts by volume of ethyl acetate and 60 parts by volume of industrial spirits) | 100 |

Example 2

For the manufacture of artificial leather, a cotton fabric is coated in known manner with a composition consisting of the following ingredients:—

| | Parts |
|---|---|
| Nitrocellulose | 22 |
| Magnesium ammonium phosphate | 8 |
| Yellow ochre | 16 |
| Brominated tricresyl phosphate (bromine content 29%) | 54 |
| Solvent as in Example 1 | 100 |

Example 3

For the manufacture of artificial leather, an alternative composition to that described in Example 2 is as follows:—

| | Parts |
|---|---|
| Nitrocellulose (10.5%–10.8% N₂) | 100 |
| Castor oil | 50 |
| Dibromotricresyl phosphate | 50 |
| Pigment | 55 |
| Mixed solvent (consisting of equal parts by volume of ethyl acetate and industrial spirits) | 500–600 |

Similar compositions may be used in which the proportions of castor oil and dibromotricresyl phosphate are each increased, for example to 75 parts. In a comparative experiment according to this example but employing tricresyl phosphate instead of the dibromo compound, the coating obtained is very sticky and becomes thermoplastic on warming to a temperature approaching 80° C., whereas the coatings produced according to the example are practically unaffected by this treatment.

As base materials there may be employed cotton grey-cloth, canvas or jaconette, or other woven cotton or linen fabrics, woven wool fabrics, woven jute fabrics such as Hessian, and felts made from wool or other textiles. There may also be used paper or artificially felted material made from superficially mercerized and preferably hydrated cellulose fibres.

I claim:

1. A composition for coating base fabric materials, the said composition containing nitrocellulose having a nitrogen content between 10.5% and 10.8% and as a softening agent therefor a brominated tricresyl phosphate compound containing between 27% and 30.5% of bromine nuclearly substituted in the hydrocarbon radical, the side chain of the hydrocarbon radical being free from bromine, the plasticizer being present in sufficient quantity to plasticize the coating on the fabric base.

2. A composition for coating base fabric materials, the said composition containing nitrocellulose having a nitrogen content between 10.5% and 10.8% and as a softening agent therefor a brominated tricresyl phosphate compound containing 29% of bromine nuclearly substituted in the hydrocarbon radical, the side chain of the hydrocarbon radical being free from bromine, the plasticizer being present in sufficient quantity to plasticize the coating on the fabric base.

3. A composition for coating base fabric materials, the said composition comprising one part by weight of nitrocellulose having a nitrogen content lying between 10.5% and 10.8% and between one and two parts by weight of a mixture of substantially equal proportions of castor oil and a brominated tricresyl compound containing between 27% and 30.5% of bromine nuclearly substituted in the hydrocarbon radical, the side chain of the hydrocarbon radical being free from bromine.

MITCHELL GRAHAM THOMSON.